Nov. 13, 1956     A. E. ANDERSON     2,770,036
SAWING APPARATUS, AND MORE PARTICULARLY A PRUNING SAW
Filed June 23, 1955     3 Sheets-Sheet 1
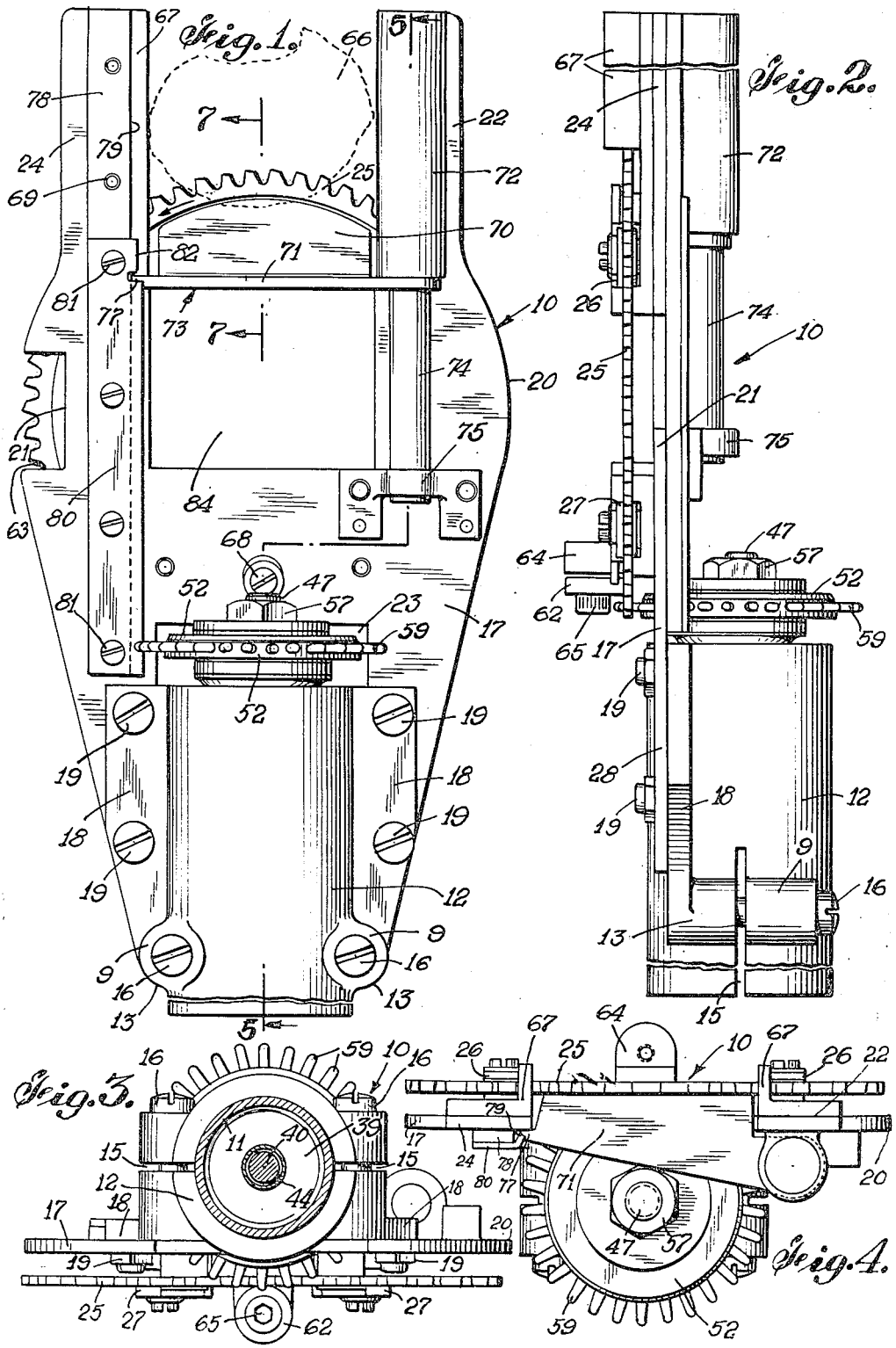

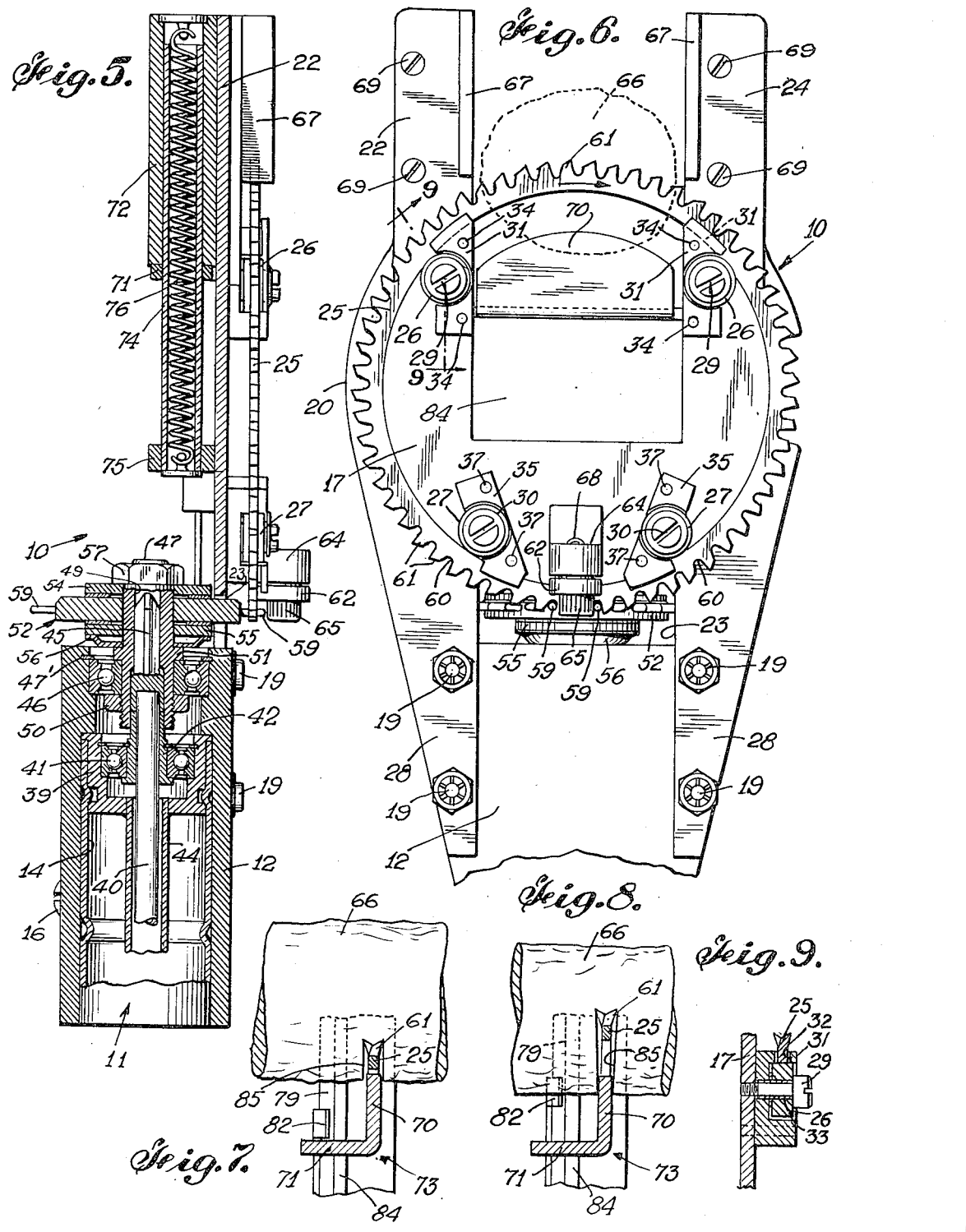

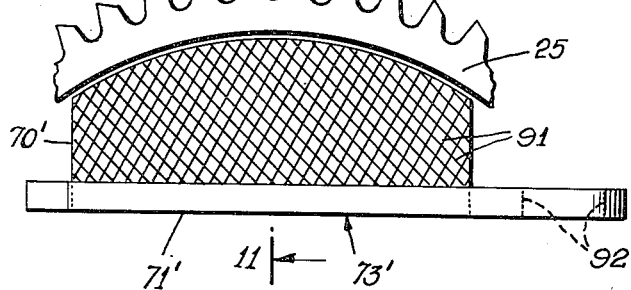
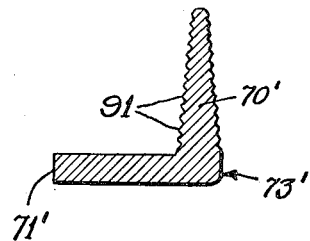
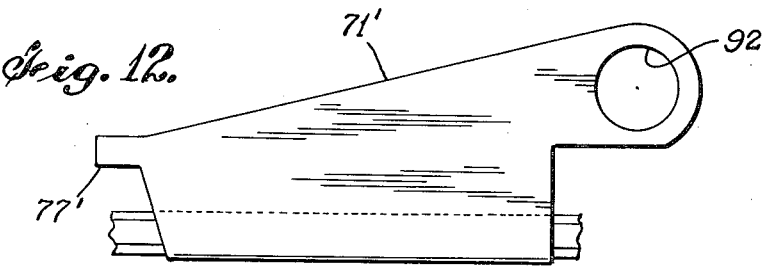
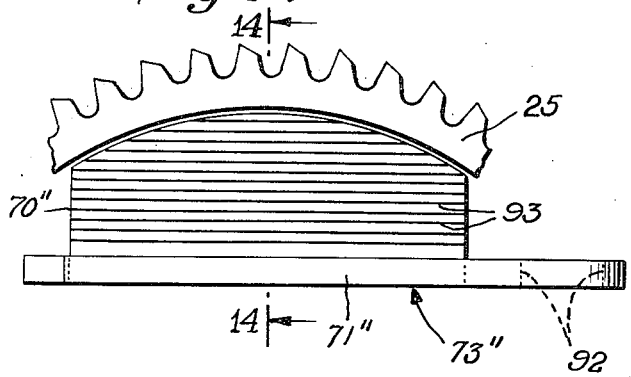
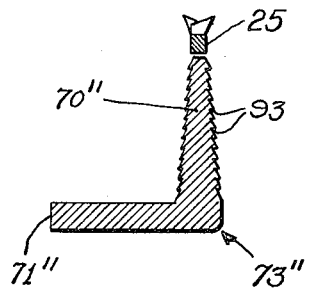

2,770,036

SAWING APPARATUS, AND MORE PARTICULARLY A PRUNING SAW

Albert E. Anderson, Greenwich, Conn., assignor, by mesne assignments, to Textron Inc., a corporation of Rhode Island Application June 23, 1955, Serial No. 517,563

17 Claims. (Cl. 30—167)

The present invention relates to a power-driven tree trimming or pruning saw and particularly to a pruning saw adapted to be held by an operator so as to cut tree limbs and branches. The pruning saw is especially advantageous when cutting limbs and branches in an upward direction.

The saw of the invention is adapted to have its cutting head supported on a pole so that the operator may stand on the ground and cut the tree limbs and branches from below. The saw-carrying head of the saw is of such construction that it is simple and light but durable, and is of relatively small dimensions so that it may be thrust through narrow openings between branches. Moreover, the mounting of the saw blade makes it possible to cut close to the trunk of the tree. When a tree branch is cut in an upward direction by a conventional saw, the kerf cut in the branch tends to bind upon the body of the saw because the outer end of the branch sags as the cut deepens. The sagging of the branch not only tends to close the bottom end of the kerf in upon the saw blade, but also places the uncut fibers of the branch immediately above the saw blade in compression, making them more difficult to cut. The saw of the preferred embodiment of the present invention is of such construction that the circular saw blade is in the form of a radially narrow annulus, thereby decreasing the area of contact between the blade and the branch. Further, in the preferred construction shown, the saw head is provided with a kerf retainer which initially follows the saw blade but which moves with the limb relative to the saw after the saw has cut into the limb to an appreciable depth. The kerf retainer keeps the bottom ends of the walls of the kerf spaced apart and thus prevents the binding of the kerf upon the blade, and also tends to prevent the limb or branch from appreciable sagging until the end of the cutting operation, thereby substantially decreasing the degree of compression to which the uncut fibers immediately above the saw blade are subjected. As a result, the saw blade body runs freely in the kerf during the entire cutting operation. The saw head of the illustrative embodiment is provided with a pair of parallel arms defining a path leading in to the saw blade for receiving and guiding limbs to be cut and for limiting the size of limbs which may be thus received for cutting by the saw.

It is among the objects of the present invention to provide a pruning saw having a new and improved construction whereby it is simple, light, and durable, to provide a pruning saw having a head carrying the saw blade which is relatively narrow and thin but which protects the saw blade from limb-sawing exposure except at a desired zone or zones, to provide a saw having a simple and effective direct drive for the saw blade, and to provide a saw with a kerf retainer movable with the limb or other work-piece after its engagement with the kerf whereby binding of the limb or other work-piece upon the saw is prevented. These results are achieved by the novel saw of the present invention, which will be described below in conjunction with the accompanying drawings, in which:

Fig. 1 is a rear elevation of the head of a preferred embodiment of a pruning saw in accordance with the present invention, an intermediate portion of the hub supporting the head being broken away;

Fig. 2 is a side elevation of the saw head as seen from the left side of Fig. 1;

Fig. 3 is a view of the saw head as seen from the bottom of Fig. 1, parts of the saw head-supporting pole and the driving shaft for the saw being shown in section;

Fig. 4 is a plan of the saw head;

Fig. 5 is a vertical section through the saw head taken approximately on line 5—5 in Fig. 1, the saw head-supporting pole and the drive shaft being broken, certain other parts being shown in elevation;

Fig. 6 is a front elevation of the head of the saw with a lower portion broken off;

Fig. 7 is a fragmentary vertical section taken approximately on line 7—7 in Fig. 1, showing the relative positions of a tree limb, the saw blade, and the kerf retainer soon after the saw blade has begun to cut the limb;

Fig. 8 is a fragmentary vertical section similar to Fig. 7 but showing the relative positions of the tree limb, saw blade, and kerf retainer after the saw blade has cut more deeply into the limb;

Fig. 9 is a vertical section through an upper saw blade-supporting and guiding means, the section being taken approximately on line 9—9 in Fig. 6, with a roller and roller-supporting stud shown in elevation;

Fig. 10 is an enlarged fragmentary elevation showing a modified form of kerf retainer;

Fig. 11 is a section taken approximately on the line 11—11 in Fig. 10;

Fig. 12 is a bottom view of the kerf retainer shown in Fig. 10;

Figs. 13 and 14 are similar to Figs. 10 and 11, respectively, but show a further modification.

The pruning saw illustrated by way of example in the drawings comprises a saw blade-carrying head, generally designated 10, which is adapted to be mounted on the upper end of a hollow pole or handle 11 of sufficient length to allow the operator to stand on the ground or on a truck or other support and to prune limbs of trees located a considerable distance above him. It will be apparent that the saw may also be used by an operator standing on a ladder or a tree limb to cut branches or limbs which lie either substantially at his level or below him. In the saw shown, the upper end of handle 11 is received and clamped within a bore 14 in a hub 12 on the head, and the handle 11 also serves to enclose and journal a shaft 40 which drives the saw blade from a suitable source of power (not shown) supported on the ground and connected to the lower end of the shaft 40 as by a flexible shaft, likewise not shown. The hub 12 is provided with two diametrically opposite slots 15 at its lower end, the slotted portion of the hub being squeezed upon the end of handle 11 by studs 16 which extend freely through holes in bosses 9 on the hub and are threaded into opposing bossing 13.

The hub 12 is provided with oppositely laterally extending vertical wings 18 offset toward the front of the hub from its axis, as best shown in Fig. 2. The wings 18 serve to support the main vertical plate 17 of the saw head. The plate 17 is generally symmetrical about the vertical center lines of Figs. 1 and 6. The plate has a vertically extending wide central recess 23 in its bottom end forming two parallel depending arms 28. The front edge of the hub 12 is received in recess 23 with the arms 28 overlying the front faces of wings 18 of the hub and secured thereby by bolts 19 as shown.

The plate 17 provides support for the rotary driven annular saw blade 25, and for the kerf-retaining blade 70 mounted within the saw blade, and itself provides two spaced vertical parallel arms 22, 24 at its top which form the main portions of guiding arms providing a limb-receiving path that extends inwardly to the saw blade. The side edges of plate 17 in the location confronting the saw blade 25 lie on a circle coaxial with the saw blade and of somewhat larger diameter than the blade to serve as a lateral guard therefor. The blade may be laterally exposed for side cutting, if desired, by providing a slot 21 through one of such rounded edge portions of plate 17. Each lower side edge of plate 17 inclines upwardly and outwardly from the lower end of its arm 28 to merge smoothly with the lower end of the rounded edge portion of the plate.

The thin radially narrow annular saw blade 25 is rotatably supported on plate 17 centrally laterally thereof, and is rim-driven by means to be described. In the constructions shown there are two upper saw-supporting cylindrical rollers 26 and two lower saw-supporting cylindrical rollers 27, supported on plate 17 and engaging the inner edge of the saw blade body. The rollers may conveniently be the outer races of ball bearings. Means is provided at each saw-blade-supporting roller to maintain the blade in a plane parallel to and a fixed distance from plate 17. The structure of the saw blade-guiding means and its relationship to the roller and the saw blade supported thereby will be more clearly understood upon consideration of Fig. 9.

In Fig. 9 there is shown in detail one of the upper saw blade-supporting and guiding means. As there shown, the roller 26 is journaled on a sleeve 33 on stud 29, the stud being screwed into the plate 17. The roller fits within a recess in block 31, the bottom of the recess serving to space the roller from the plate. The surface of block 31 confronting the inner edge of saw blade 25 is provided with a circumferentially extending groove 32 which accurately and slidingly receives the inner edge of the saw blade to maintain the blade in a fixed plane parallel to plate 17. The block 31 is held fixed with respect to plate 17 by the stud 29 and pins 34 extending through the block and the plate 17. The lower guide blocks 35 are each of a construction similar to that of blocks 31, being provided with a saw blade-receiving groove, and being held on the plate 17 by pins 37 and a stud 30 which supports the blade-guiding roller 27.

The mechanism by which the saw blade 25 is driven is shown in detail in Fig. 5. The upper end of the tubular handle 11 is provided with an annular inner member 39 affixed to the handle, and supporting a ball bearing 41 which is retained in a counterbore in member 39 by a split spring ring. The inner race of bearing 41 is affixed to a sleeve-like driving member 42 which is secured to the upper end of driving shaft 40 as by being soldered or brazed thereto. The shaft 40 rotates within a small central tube 44, secured to end member 39 as by being welded thereto. Tube 44 has an inner diameter slightly exceeding the diameter of shaft 40. Tube 44 thus keeps the shaft 40 from developing excessive whip, which might otherwise occur particularly when the shaft 40 is made of aluminum and is of considerable length. The lower end of shaft 40 may be journaled in another bearing supported at the bottom of handle 11 in a lower end member (not shown) similar to member 39.

The upper end of member 42 is in the form of a square solid central extension 45 which is slidably received in a square central passage 49 in a sleeve 47 which is rotatably mounted at the upper end of hub 12. The outer race of ball bearing 46 is mounted in a counterbore in the hub and is retained therein by a split spring ring 47'. The inner race of the bearing mounts the sleeve 47, and is held between a flange 51 on the sleeve and a nut 50 on the threaded lower end of the sleeve. The sleeve 47, which functions as a stub shaft-mounting driving pinion 52, is thus fixed axially with respect to the hub 12 and is rotated by the shaft 40. When the saw head 10 is removed from the handle 11, the sleeve 47 slides with respect to the squared end portion 45 of sleeve 42. The upper end of member 45 is tapered, as shown, to facilitate entry of member 45 into passage 49 upon the remounting of the saw head on the handle.

The sleeve 47 carries the sprocket-like driving pinion 52 thereon between upper and lower washers 54 and 55, respectively. Such washers have suitable friction faces engaging the central body portion of the pinion. The washers are maintained in forcible driving contact with the pinion by a nut 57 screwed onto the threaded solid upper end of sleeve member 47 and engaging the upper washer 54, and by an upwardly dished spring washer 56 interposed between the lower pinion-engaging washer 55 and the flange 51 on sleeve member 47. The thus described means for mounting and driving the pinion 52 in effect constitutes an adjustable slip clutch for driving the pinion, and thus the saw blade 25 by the pinion in the manner to be described, whereby the saw and pinion, as well as other parts of the saw head and the driving means therefor, are protected against injury if the saw should become overloaded during a cutting operation.

The saw blade 25 is driven in the direction indicated by the arrows in Figs. 1 and 6 by engagement of uniformly spaced radially projecting spoke-like pinion teeth 59 with rounded roots 60 between successive ones of teeth 61 on the saw blade 25. As shown, the roots of the teeth are uniformly spaced and lie on a circle coaxial with the tips of teeth 61 of the saw blade. The manner of engagement between the saw blade and the pinion teeth is clearly shown in Figs. 2, 3, 5, and 6. The axis of the pinion 52 lies in the central vertical plane containing the axis of saw blade 25, and at the rear of plate 17. The edge of the pinion confronting the saw blade projects through the lower recess 23 to contact the blade at the lower central zone thereof.

The construction shown is rugged and compact. Only a small extent of the pinion is exposed on the forward face of the saw head, and lies diametrically opposite the upper cutting zone. Most, if not all, chips which may have fallen into one or more of the roots 60 of the saw teeth at the cutting zone will have been dislodged therefrom both by centrifugal force due to rotation of the saw blade and by the action of gravity by the time such roots of the teeth have reached engagement with the teeth of the pinion. The teeth 59 of the pinion, which progressively enter the roots 60 of the teeth from the side as illustrated in Fig. 3, positively remove any remaining chips from the roots of the saw teeth. The teeth 59 of the pinion, being rounded in section, do not tend to catch chips which may fall from the kerf of the cut or from the saw blade. Also, rotation of the pinion 52 will throw chips and sawdust off its teeth 59. The described driving means for the saw is simple and compact, allowing the saw head to be quite thin in a direction at a right angle to the plane of rotation of the saw blade.

To maintain the saw blade 25 in its plane of rotation at the bottom zone thereof in engagement with the teeth 59 of pinion 52, there is provided a vertical guide roller 62 contacting the front face of the saw blade immediately above the center of its zone of engagement with the pinion teeth. Roller 62, which may be the outer race of a ball bearing, is mounted on a vertical stud 65 threaded into the forwardly projecting horizontal portion 64 of an L-shaped bracket. The vertical portion of such bracket is fixedly attached to the forward face of plate 17 by a stud 68.

The limbs and branches to be cut at the top of the saw head are guided to the saw blade by the confronting parallel vertical flat faces of upstanding L-shaped guiding members 67 set into recesses in the confronting inner edges of the upstanding arms 22, 24 on plate 17, as shown, so that the inner faces of members 67 lie flush with the lower, unrecessed edges of the arms. Members 67 are attached to the arms 22, 24 by studs 69, as shown in Figs. 1, 4 and 6. During the cutting operation the limb 66 being cut is forced against the left-hand guide 67 in Fig. 1 by the action of the saw blade 25. The two parallel guides 67 are spaced apart a suitable distance to form, in effect, a limit gauge whereby the saw head cannot be used to cut limbs having a diameter greater than the distance between guides, thus protecting the saw and its drive mechanism against overloading. In addition, the two spaced guides present a limb-receiving passage between them which facilitates initial placement of the saw head against the bottom surface of the limb to be cut.

The portion of saw blade 25 exposed on the side of the saw head at recess 21 may be used in the trimming of twigs and relatively small branches. Such small twigs and branches are caught between the teeth of the saw blade and the lower edge 63 of recess 21 and are thus quickly severed.

The saw shown is provided with a kerf retainer which is pinched between the sides of the kerf in the workpiece such as a tree limb 66 relative to the saw blade after the blade has entered the limb an appreciable distance but before the limb has begun to bind on the saw blade. During the remainder of the cut the kerf retainer remains substantially fixed with respect to the limb, keeping the sides of the kerf from binding upon the sides of the saw blade, as the saw blade moves ahead. Means is provided to urge the kerf retainer toward the saw, whereby the kerf retainer is automatically returned to its initial position adjacent the inner edge of the annular saw blade upon completion of the cut. As a result of the provision of the kerf retainer the power requirements of the saw are much less than they would be if the kerf in the work-piece were allowed to bind upon the saw, and wear and stresses upon the saw blade and the parts of the saw head are also greatly decreased.

The construction and manner of operation of the kerf retainer will be apparent from Fig. 1, 4, 5, 6, 7, and 8.

As shown, there is provided a reciprocable vertical flat kerf-retaining blade 70 which lies inwardly of the saw blade and substantially spans between the vertical work-piece guides 67. The upper edge of the kerf-retaining blade is rounded, having a radius slightly less than that of the inner edge of the saw blade, and lies slightly spaced from the inner edge of the blade when in its initial terminal position, as shown in Figs. 1 and 7. The center lines of the sections of blade 70 and of the saw blade 25 are aligned. The blade 70 is shown with a thickness slightly greater than that of the body of the saw blade 25, but less than the initial width of the kerf cut by the set teeth 61 of the saw blade, so that the kerf-retaining blade enters freely into the initial shallow kerf in the limb, as shown in Fig. 7.

The kerf-retaining blade may, if desired, be made slightly thinner than the body of the saw blade and still enter freely into the initial edge of the kerf.

The blade 70 is a part of a member 73 which is L-shaped in vertical section, the horizontal portion 71 of such member projecting through a central vertical recess 84 in plate 17 from the rear to the forward face thereof. Portion 71 has its right-hand end (Fig. 1) affixed to an upwardly spring-biased plunger 74. Plunger 74 is slidable in vertical cylinder 72 affixed to the rear surface of arm 22 by the same studs which attach guide member 67 to such arm. The outboard end of member 73 has a tang or finger 77 which is slidably received in a vertical guide-way 79 formed by the inner edge of a narrow plate member 78 attached to the rear face of arm 24 by studs 69, the rear face of arm 24, and a cover plate 80 attached to the rear face of plate 17 by studs 81. The overhanging edge of plate 80 is inbent at 82 to form an upper stop for finger 77. The lower end of cylinder 72 forms an upper stop for the end of member 73 attached to the plunger 74.

As shown in Fig. 5, the plunger 74 is constantly urged upwardly in cylinder 72 by a coil tension spring 76 extending between a cross member affixed to the upper end of the cylinder and a bottom closure member on the plunger. The lower end of the plunger is guided for vertical reciprocation by a guide bracket 75 affixed to the plate 17.

The action of the kerf-retaining blade 70 in preventing binding of the kerf upon the saw blade will be readily understood by consideration of Figs. 6 and 8. As the saw cuts progressively deeper into the limb, the outer end of the kerf sags so that the kerf is first pinched in at the bottom to contact the blade 70 and then squeezes the blade more and more tightly. In Figs. 6 and 8 the kerf in the limb 66 is shown extending roughly half-way through the limb. It will be assumed that before the depth of cut shown in these figures was reached the limb had sagged enough to cause the sides of the kerf 85 near the entrance end of the kerf to a clamp blade 70 forcibly enough to cause the blade to overcome the action of the spring 76 and to remain stationary while the saw blade moves upwardly. During the remainder of the cut the blade 70 remains fixed with respect to the limb while the saw blade continues to travel through the limb. The wedging of the kerf-retaining blade 70 between the outer or entrance edges of the kerf prevents binding of the limb upon the saw blade. When the cut has been completed, side-wise clamping pressure upon the kerf-retaining blade 70 is, of course, released. The spring 76 then immediately automatically raises the member 73 and thus the blade 70 into the initial terminal position of Figs. 1 and 7 so that the saw is ready for making another similar cutting operation.

In Figs. 10 to 12, there is shown—on an enlarged scale—a modified form of kerf retainer 73' which is bell-shaped in vertical section (Fig. 11), having a kerf-retaining blade 70' and a horizontal portion 71'. The blade 70' is tapered in cross section, the upper edge of the blade being approximately as thick or somewhat thinner than the body portion of the saw blade 25 and the base being thicker. However, the angle of taper is relatively small, for example 5 to 15 degrees, so that the blade is not squeezed out of the kerf when the edges are squeezed together, as illustrated in Fig. 8. Moreover, it is desirable to roughen opposite faces of the blade, for example by forming small ridges or serrations in the surfaces. As illustrated in Figs. 10 and 11, the blade 70' is provided on opposite faces with intersecting ridges forming a knurled pattern, as indicated at 91. The horizontal portion 71' of the kerf retainer is provided with a hole 92 for attachment to the plunger 74 and, at the opposite side, with a guiding finger 77' which corresponds to the finger 77 of the previous embodiment.

Figs. 13 and 14 show a further modification in which a kerf retainer 73" has a horizontal base portion 71" and a tapered kerf-retaining blade 70" on opposite sides of which there are provided parallel grooves 93 of sawtooth cross section. By reason of their shape, the grooves 93 do not in any way interfere with entry of the kerf-retaining blade into the kerf but counteract any extruding action resulting from the blade being squeezed between opposite sides of the kerf as the saw proceeds to cut through a branch.

While a preferred embodiment of the invention has been shown by way of example in the drawings and particularly described, it will be understood that the invention is in no way limited to this single embodiment.

What I claim and desire to secure by Letters Patent is:

1. In a pruning saw adapted for cutting limbs from below, a saw head comprising a rotatable annular rim-driven saw blade having teeth on its periphery; means for supporting the saw blade for rotation about its axis and for driving the saw blade, means at the top of the saw head forming with the saw blade a limb-receiving and cutting zone, and a kerf retainer aligned with the saw blade at the cutting zone for engagement with the limb on opposite sides of the kerf formed therein by the saw blade.

2. In a pruning saw adapted for cutting limbs from below, a saw head comprising a rotatable annular saw blade having cutting teeth on its periphery, a frame comprising a vertical plate for supporting the saw blade on the forward face of the plate for rotation parallel and close to the plate, means forming with the saw blade a limb-receiving and cutting zone at the top of the saw head, means for driving the saw blade, a kerf retainer which is L-shaped in vertical section with an upstanding leg in the form of a kerf-retaining blade aligned with the saw blade at the cutting zone for reception in the kerf formed by the saw blade, and a horizontal leg extending to the rear of the plate from the kerf-retaining blade through a vertically elongated recess in the plate, means on the rear of the plate for guiding the kerf retainer for vertical movement so that the kerf-retaining blade may move downwardly from an upper terminal position in which it lies close to the inner edge of the upper portion of the saw blade, and means comprising a spring-biased vertical plunger mounted on the rear of the plate and connected to the kerf retainer at one side thereof for constantly urging the kerf spreader toward its upper terminal position.

3. In sawing apparatus, the combination of a sawing cutter, means to support the cutter for cutting movement with respect to a work-piece, a kerf retainer, means mounting the kerf retainer in alignment with the cutter at the rear thereof for engagement with the work-piece on opposite sides of the kerf formed by the cutter and for reciprocation relatively toward and away from the cutter, and yieldable means urging the kerf retainer toward a terminal position adjacent the cutter.

4. In a sawing machine, the combination of a sawing cutter for cutting a work-piece, means to support the cutter and to drive it for cutting movement with respect to the work-piece, a kerf-retaining blade, means mounting the kerf-retaining blade in alignment with the cutter at the rear thereof for reception in the kerf formed by the cutter and for reciprocation relatively toward and away from the cutter, and yieldable means urging the kerf-retaining blade toward a terminal position adjacent the cutter, the last-named means allowing movement of the kerf-retaining blade with the work-piece relative to the cutter when the kerf-retaining blade is pinched with substantial force by the kerf.

5. A sawing machine according to claim 4, in which the sawing cutter has a body and cutting teeth spaced outwardly on both sides of the body, the kerf-retaining blade is centrally aligned with the cutter body, and the kerf-retaining blade has a thickness in that portion which is received in the kerf which is no greater than that of the cutter across the tips of the teeth thereon but is greater than that of the body of the cutter.

6. In a sawing machine, the combination of a rotatable annular rim-driven saw blade having teeth on its periphery, means for supporting the saw blade for rotation about its axis and for driving the saw blade to cut a work-piece, means defining with the saw blade a cutting zone, a kerf retainer aligned with the saw blade and located radially inwardly of the saw blade at the cutting zone for engagement with the work-piece on opposite sides of the kerf formed therein by the saw blade, means mounting the kerf retainer for movement toward and away from the saw blade, and yieldable means urging the kerf retained toward a terminal position adjacent the inner edge of the saw blade.

7. In a sawing machine, the combination of a rotatable annular rim-driven saw blade having teeth on its periphery, means for supporting the saw blade for rotation about its axis and for driving the saw blade, means defining with the saw blade a cutting zone, a kerf-retaining blade aligned with the saw blade and located radially inwardly of the saw blade at the cutting zone for reception in the kerf formed by the saw blade, means mounting the kerf-retaining blade for movement toward and away from the saw blade, and yieldable means urging the kerf-retaining blade toward a terminal position adjacent the inner edge of the saw blade.

8. A sawing machine according to claim 7, in which the machine is adapted for use as a pruning saw to cut tree limbs from below, and in which the machine has a cutting zone at the top of the saw blade, the saw blade has a body and cutting teeth spaced outwardly on both sides of the body, the kerf-retaining blade is centrally aligned with the saw blade body and reciprocates vertically, and the kerf-retaining blade has a thickness in that portion thereof which is received in the kerf which is no greater than that of the saw blade across the tips of the teeth thereon but is greater than that of the body of the saw blade.

9. A pruning saw according to claim 8, in which the kerf-retaining blade has a thickness in that portion received in the kerf which is somewhat less than that of the cutter across the tips of the teeth thereon.

10. A pruning saw according to claim 8, in which the means defining with the saw blade a cutting zone comprises a pair of vertically extending straight limb-guiding arms projecting upwardly beyond the saw blade and leading downwardly and past the saw blade on opposite sides of the axis of the saw blade, and the kerf-retaining blade extends laterally between said guiding arms.

11. In a sawing machine, the combination of a sawing cutter having spaced teeth with roots therebetween, means to support the cutter for driven cutting movement, and a cutter-driving pinion mounted to rotate about an axis extending generally at a right angle to the path of movement of the cutter, the pinion having generally radially projecting spaced teeth meshing with the roots of the teeth of the cutter.

12. In a sawing machine, the combination of a circular saw blade having spaced teeth with rounded roots of appreciable width therebetween, a frame to support the saw blade for rotation about its axis, and a saw blade-driving pinion mounted on the frame to rotate about an axis extending generally at a right angle to the axis of the saw blade, the pinion having generally radially projecting spaced teeth rounded in section meshing with the roots of the teeth of the saw blade.

13. A sawing machine according to claim 12, in which a saw blade-guiding roller is mounted on the frame on the side of the saw blade opposite from the pinion and in general alignment with the pinion, the roller engaging the body of the saw blade to prevent deflection thereof by the pinion out of its plane of rotation.

14. A sawing machine according to claim 12, in which the circular saw blade is a radially narrow annulus having teeth on its periphery and the saw blade is supported for rotation about its axis by rollers engaging its inner edge.

15. In a pruning saw adapted to cut tree limbs from below, the combination of a circular blade having uniformly spaced teeth on its periphery, the saw blade having rounded roots of appreciable width therebetween lying on a circle coaxial with the tips of the teeth, a frame to support the saw blade for rotation in its plane about its axis, means on the frame defining with the saw blade a cutting zone at the top of the saw blade, and a saw blade-driving pinion mounted on the frame to rotate about an axis fixed with respect to the plane of the saw blade and extending generally at a right angle to the axis of the saw blade, the pinion having uniformly spaced generally radially projecting spoke-like teeth rounded in section meshing with the roots of the teeth of the saw blade at a location generally at the bottom of the saw blade.

16. In a pruning saw adapted for cutting limbs of trees from below, the combination of a rotatable rim-driven saw blade, a frame for supporting the saw blade, a hub-like member attached to the frame for the reception of an elongated handle supporting an elongated driving shaft, a stub shaft mounted on the frame and extending generally at right angles to the axis of the saw blade, a pinion mounted on the stub shaft for engaging and driving the saw blade, the means for driving the saw blade, including the elongated driving shaft, the stub shaft, and the saw-engaging pinion including a slip-clutch which yields upon the overloading of the saw.

17. In a pruning saw adapted for cutting limbs of trees from below, the combination of a rotatable saw blade, a frame comprising a vertical laterally symmetrical plate and means for supporting the saw blade for rotation parallel and close to the plate, a hub-like member centrally attached to the bottom of the plate for the reception of a vertical elongated handle rotatably supporting an elongated driving shaft, a stub shaft rotatably supported by the hub-like member, a pinion mounted on said stub shaft and engaging teeth on said saw blade to drive said blade, and means for detachably connecting the driving shaft to the stub shaft.

References Cited in the file of this patent

UNITED STATES PATENTS

| 1,816,966 | Gray et al. | Aug. 4, 1931 |
| 2,713,717 | Smithey | July 26, 1955 |

FOREIGN PATENTS

| 645,261 | Great Britain | Oct. 25, 1950 |